United States Patent
Marth et al.

(10) Patent No.: US 11,761,970 B2
(45) Date of Patent: Sep. 19, 2023

(54) AUTOSAMPLER RAIL SYSTEM WITH MAGNETIC COUPLING FOR LINEAR MOTION

(71) Applicant: Elemental Scientific, Inc., Omaha, NE (US)

(72) Inventors: Beau A. Marth, La Vista, NE (US); Tyler Yost, Omaha, NE (US)

(73) Assignee: Elemental Scientific, Inc., Omaha, NE (US)

( * ) Notice: Subject to any disclaimer, the term of this patent is extended or adjusted under 35 U.S.C. 154(b) by 353 days.

(21) Appl. No.: 17/208,136

(22) Filed: Mar. 22, 2021

(65) Prior Publication Data

US 2021/0293835 A1 Sep. 23, 2021

Related U.S. Application Data

(60) Provisional application No. 62/992,334, filed on Mar. 20, 2020.

(51) Int. Cl.
*G01N 35/00* (2006.01)
*H02K 49/10* (2006.01)

(52) U.S. Cl.
CPC ....... *G01N 35/0099* (2013.01); *H02K 49/106* (2013.01)

(58) Field of Classification Search
CPC .............. G01N 35/0099; G01N 35/10; G01N 2035/1027; H02K 49/106; H02K 49/10; B65G 54/025
See application file for complete search history.

(56) References Cited

U.S. PATENT DOCUMENTS

| 3,847,502 | A  | * | 11/1974 | Isbell ..................... H02K 49/06 |
|           |    |   |         | 310/104 |
| 6,161,722 | A  | * | 12/2000 | Soodi ................... F16K 31/086 |
|           |    |   |         | 222/1 |
| 6,537,434 | B1 |   | 3/2003  | McGrath et al. |
| 7,194,949 | B2 |   | 3/2007  | Noda |
| 7,201,072 | B1 |   | 4/2007  | Wiederin et al. |
| 9,046,504 | B2 |   | 6/2015  | Kanayama |
| 10,335,792 | B2 |  | 7/2019  | Nuotio et al. |
| 10,514,329 | B1 |  | 12/2019 | Toms |

(Continued)

FOREIGN PATENT DOCUMENTS

EP 0769842 B1 12/1998

OTHER PUBLICATIONS

PCT International Search Report and WrittenOpinion for PCT/US2021/023426, dated Jul. 6, 2021.

*Primary Examiner* — Jill A Warden
*Assistant Examiner* — John McGuirk
(74) *Attorney, Agent, or Firm* — Kevin E. West; Advent, LLP

(57) ABSTRACT

Systems and methods are described for preventing the release of metal particles from an autosampler that could otherwise be detected within a sample during sample analysis. In an example implementation, an autosampler systems includes, but is not limited to, a sample probe support structure; a z-axis support; an outer shuttle coupled with an outer surface of the z-axis support; and an inner shuttle linearly moveable within an interior volume of the z-axis support, the inner shuttle magnetically coupled with the outer shuttle to translate linear motion of the inner shuttle to the outer shuttle.

19 Claims, 10 Drawing Sheets

(56) References Cited

U.S. PATENT DOCUMENTS

| | | |
|---|---|---|
| 2001/0013169 A1 | 8/2001 | Fassbind et al. |
| 2009/0146507 A1* | 6/2009 | Teramachi ............ H02K 49/10 |
| | | 310/12.24 |
| 2010/0043211 A1 | 2/2010 | Pedrazzini |
| 2017/0108523 A1 | 4/2017 | Van Grinsven |
| 2017/0328927 A1 | 11/2017 | Wang et al. |
| 2018/0364269 A1 | 12/2018 | Rose |
| 2020/0033373 A1 | 1/2020 | Van Grinsven |

* cited by examiner

AUTOSAMPLER RAIL SYSTEM WITH MAGNETIC COUPLING FOR LINEAR MOTION

CROSS-REFERENCE TO RELATED APPLICATIONS

The present application claims the benefit of 35 U.S.C. § 119(e) of U.S. Provisional Application Ser. No. 62/992,334, filed Mar. 20, 2020, and titled "AUTOSAMPLER RAIL SYSTEM WITH MAGNETIC COUPLING FOR LINEAR MOTION." U.S. Provisional Application Ser. No. 62/992,334 is herein incorporated by reference in its entirety.

BACKGROUND

In many laboratory settings, it is often necessary to analyze a large number of chemical or biochemical samples located in individual sample containers. In order to streamline such processes, the manipulation of samples has been mechanized. Such mechanized sampling is commonly referred to as autosampling and is performed using an automated sampling device or autosampler.

SUMMARY

Autosampler systems are described that prevent the release of metal particles from an autosampler that could otherwise be detected within a sample during sample analysis. A system embodiment includes, but is not limited to, a sample probe support structure configured to hold a sample probe to transfer fluid samples through the sample probe; a z-axis support coupled with the sample probe support structure; an outer shuttle coupled with an outer surface of the z-axis support and coupled with the sample probe support structure; and an inner shuttle linearly moveable within an interior volume of the z-axis support, the inner shuttle magnetically coupled with the outer shuttle to translate linear motion of the inner shuttle to the outer shuttle to provide linear motion of the sample probe support structure.

In an aspect, an autosampler system includes, but is not limited to, a sample probe support structure configured to hold a sample probe to transfer fluid samples through the sample probe; a z-axis support coupled with the sample probe support structure; an outer shuttle coupled with the z-axis support and coupled with the sample probe support structure, the outer shuttle including at least a first magnet; an inner shuttle linearly moveable within an interior volume of the z-axis support, the inner shuttle including at least a second magnet, the inner shuttle magnetically coupled with the outer shuttle via magnetic interaction between the first magnet and the second magnet to translate linear motion of the inner shuttle to the outer shuttle to provide linear motion of the sample probe support structure, wherein the z-axis support includes a tube having a portion disposed between the outer shuttle and the inner shuttle, the tube defining the interior volume through which the inner shuttle passes during linear motion.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

DETAILED DESCRIPTION

Overview

Figure 1A:
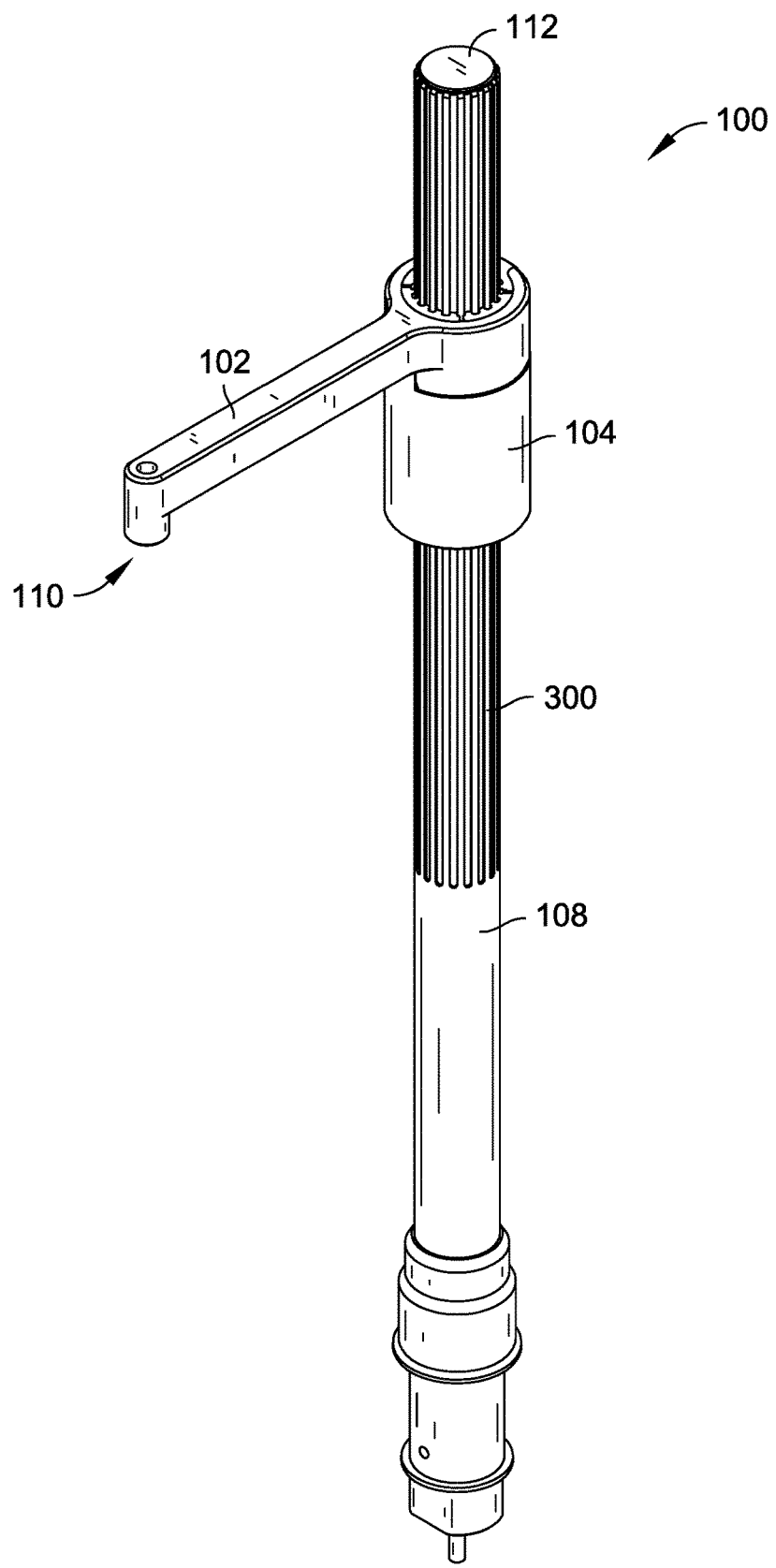
FIG. 1A is an isometric view of an autosampler probe rail system for preventing the release of metal particles from an autosampler that could otherwise be detected within a sample during sample analysis in accordance with an example embodiment of the present disclosure.

An automated sampling device, or autosampler, can support a sample probe relative to a vertically-oriented rod which moves the sample probe along or across one or more directions of movement. For instance, the sample probe can be coupled to a vertically-moveable portion of the rod by a probe support arm or other device to move the probe in a vertical direction, such as to position the probe into and out of sample vessels (e.g., tubes or other containers), rinse vessels, standard chemical vessels, diluent vessels, and the like, on a deck of the autosampler. In other situations, the rod can be rotated to facilitate movement of the probe about a horizontal plane, such as to position the probe above other sample vessels and other vessels positioned on the deck.

Autosamplers can include metallic mechanical or structural parts that move with respect to each other to facilitate one or more motions of the probe. As the parts begin to wear (e.g., through repeated friction-based interactions), metal particles can be released onto the deck of the autosampler and into the vessels positioned about the probe arm. For instance, metal particles can be directly deposited into sample vessels, onto the probe, or into other vessels used in the sample preparation process (e.g., rinse containers, standard chemical containers, diluent containers, etc.), thereby introducing contaminants to the samples or other fluids. Such contaminants are detectable via analytic instruments and can skew analytic measurements of the samples and other fluids by providing unreliable or otherwise inaccurate data about the contents of the fluids introduced for analysis by the probe. Further, the metallic mechanical or structural parts can be exposed to harsh chemicals present on the autosampler deck, such as corrosive acids, which can accelerate the release of metal particles through normal operation of the autosampler.

Accordingly, systems and methods are disclosed for preventing the release of metal particles from an autosampler that could otherwise be detected within a sample during sample analysis. In an aspect, a system includes an inner shuttle magnetically coupled with an outer shuttle configured to support a sample probe. The inner shuttle is encapsulated within a tube formed from or coated with a chemically-inert material (e.g., a fluoropolymer) and the outer shuttle is formed from or coated with a chemically-inert material (e.g., a fluoropolymer) such that no metal features are exposed to the external environment during operation of the autosampler. The inner shuttle moves within the tube and the movement is translated to the outer shuttle via magnetic coupling which in turn is translated to the probe support structure. In implementations, the tube defines surface features (e.g., splines) on an outer surface of the tube, with the outer shuttle having corresponding features on an inner surface. The surface features of the tube and the outer shuttle interact to translate rotational motion of the tube to the outer shuttle, which in turn is translated to the probe support structure. The autosampler facilitates multiple planes of motion of the sample probe without risk of exposure of metal particles to the sample vessels and other containers positioned on the deck of the autosampler.

Example Implementations

Referring to FIGS. 1A through 8, an autosampler probe rail system ("system 100") for preventing the release of metal particles from an autosampler that could otherwise be detected within a sample during sample analysis in accordance with an example embodiment of the present disclosure is shown. The system 100 generally includes a probe support arm 102, an outer shuttle 104, an inner shuttle 106, and a z-axis support 108. One or more portions of the system 100 can be formed from or coated with a chemically-inert material to prevent exposure of metal components to the external environment of the system 100, such as to prevent introduction of metal contaminants into sample vessels or other fluid containers adjacent the autosampler. In implementations, the probe support arm 102, the outer shuttle 104 and the z-axis support each include structures formed from or coated with a chemically-inert material, for example, a fluoropolymer, such as polytetrafluoroethylene (PTFE). In implementations, all external surfaces of the system 100 include the chemically-inert material to prevent corrosion or other material breakdown of the system 100 when exposed to samples present on the deck or otherwise exposed to the external environment.

The probe support arm 102 includes a probe support 110 which holds a sample probe and associated tubing for drawing fluids from, or introducing fluids to, sample vessels positioned adjacent the system 100, such as on a deck of an autosampler system. The probe support arm 102 is coupled to the outer shuttle 104 (e.g., via friction fit interlock, via snap coupling, or the like), where each of the probe support arm 102 and the outer shuttle 104 define apertures into which an upper portion 112 of the z-axis support 108 fits to couple the probe support arm 102 and the outer shuttle 104 to the z-axis support 108. For example, the upper portion 112 of the z-axis support 108 includes a generally circular shape which corresponds to generally circular openings in each of the probe support arm 102 and the outer shuttle 104. While generally circular shapes are shown, other shapes can be utilized for the system 100 including but not limited to rectangular shapes, triangular shapes, irregular shapes, and the like. The probe support arm 102 can be held in place relative to the z-axis support 108 through friction fit between the respective structures and through magnetic coupling between the outer shuttle 104 and the inner shuttle 106 positioned within the z-axis support. In implementations, the probe support arm 102 and the outer shuttle 104, or portions thereof, can be formed as a unitary structure.

Figure 1B:
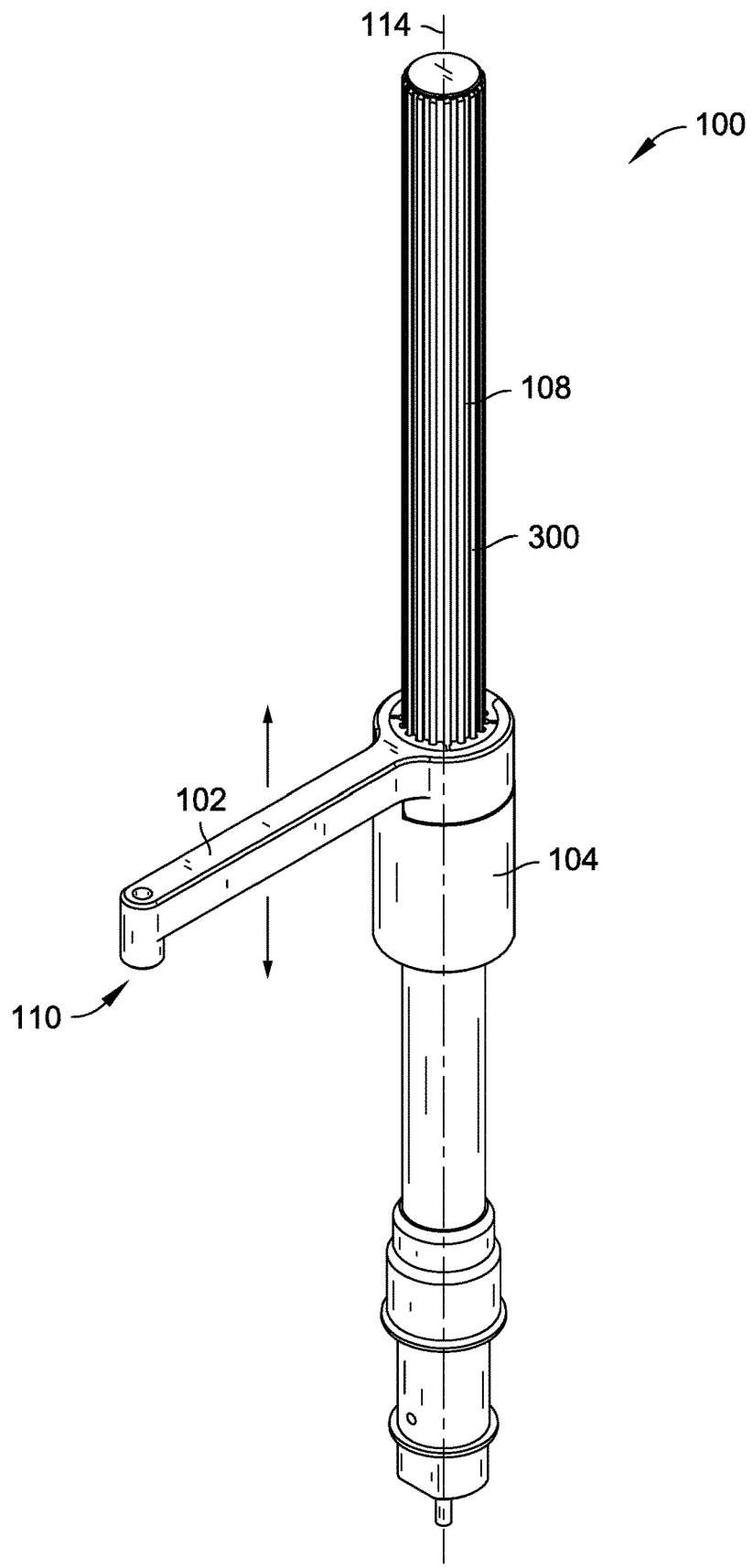
FIG. 1B is an isometric view of the autosampler probe rail system of FIG. 1A, with a support arm of the autosampler transitioned to a lower position along a z-axis.
Figure 1C:
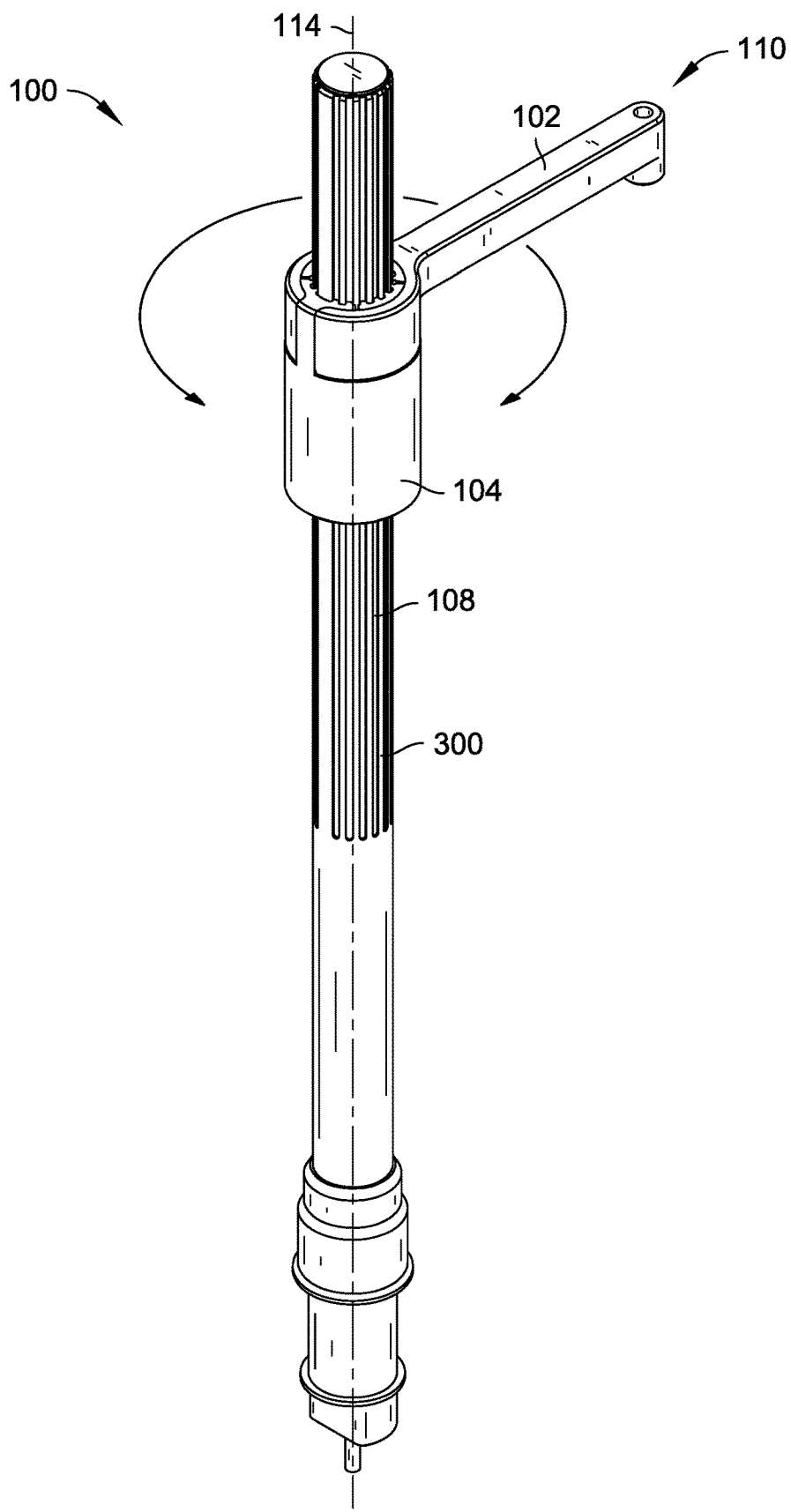
FIG. 1C is an isometric view of the autosampler probe rail system of FIG. 1A, with the support arm rotated about a z-axis.

The system 100 controls the positioning of a sample probe held by the probe support arm 102 through controlled positioning of the outer shuttle 104 and rotation of the z-axis support 108. For example, FIG. 1B shows movement of the outer shuttle 104 along the z-axis support 108 (e.g., along the z-axis 114), which in turn moves the probe support arm 102 via interactions between the outer shuttle 104 and the inner shuttle 106. FIG. 1C shows rotational movement of the probe support arm 102 through rotation of the z-axis support 108 described further herein.

Figure 2:
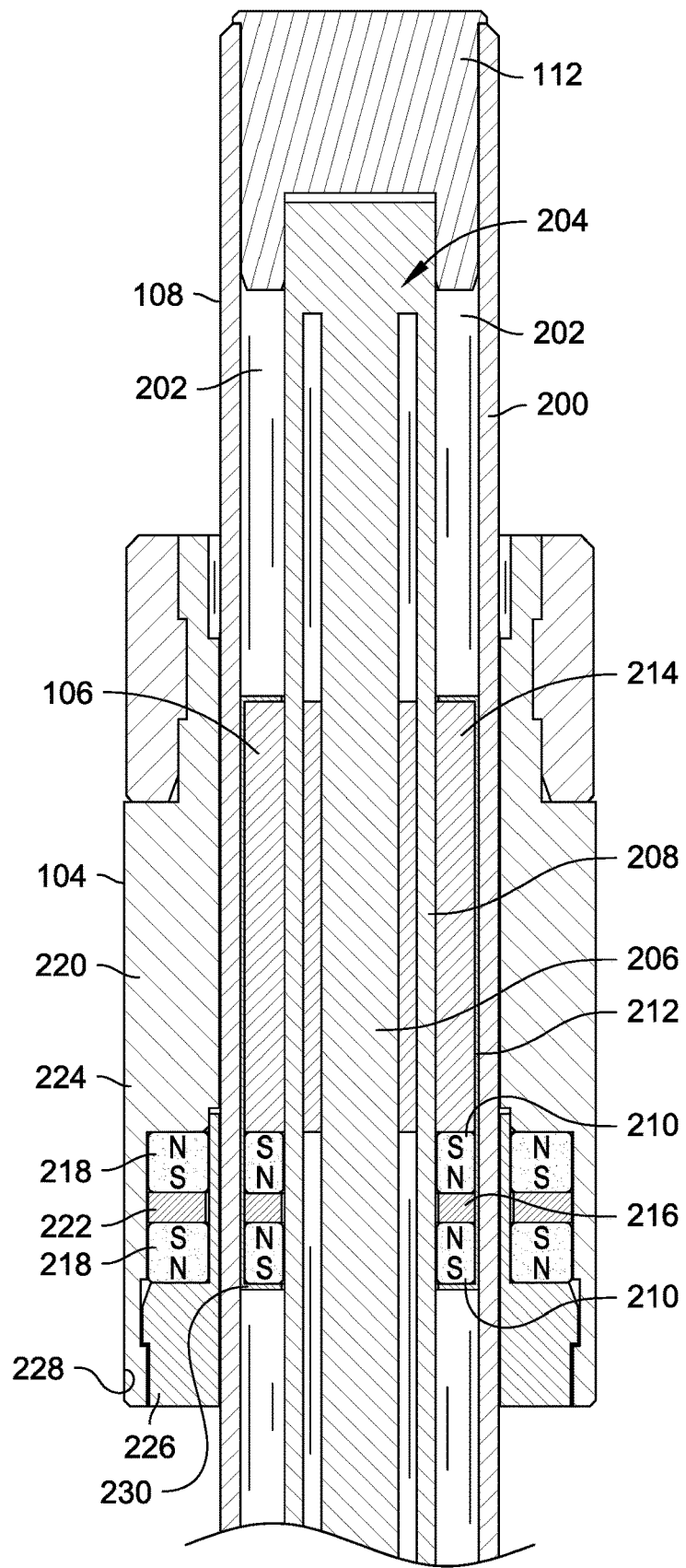
FIG. 2 is a partial cross-sectional side view of the autosampler probe rail system of FIG. 1A.
Figure 3:
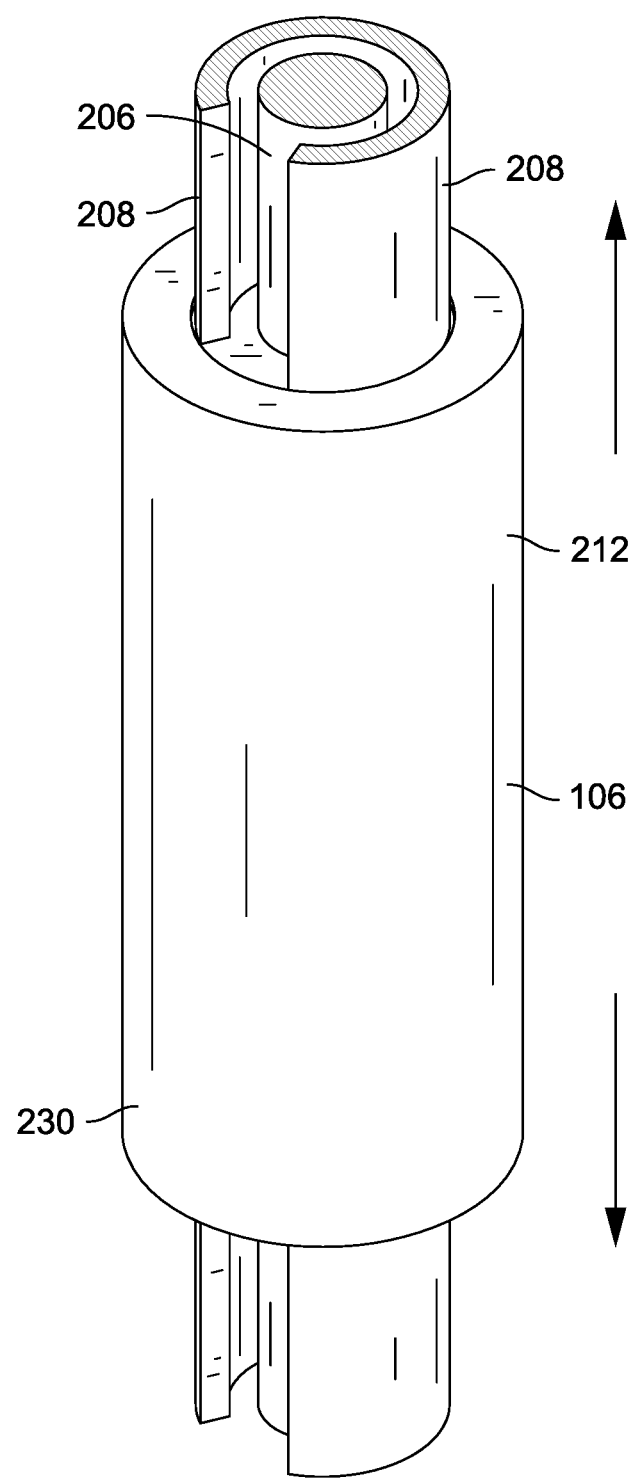
FIG. 3 is a partial isometric view of an inner shuttle of the autosampler probe rail system of FIG. 1A.
Figure 4:
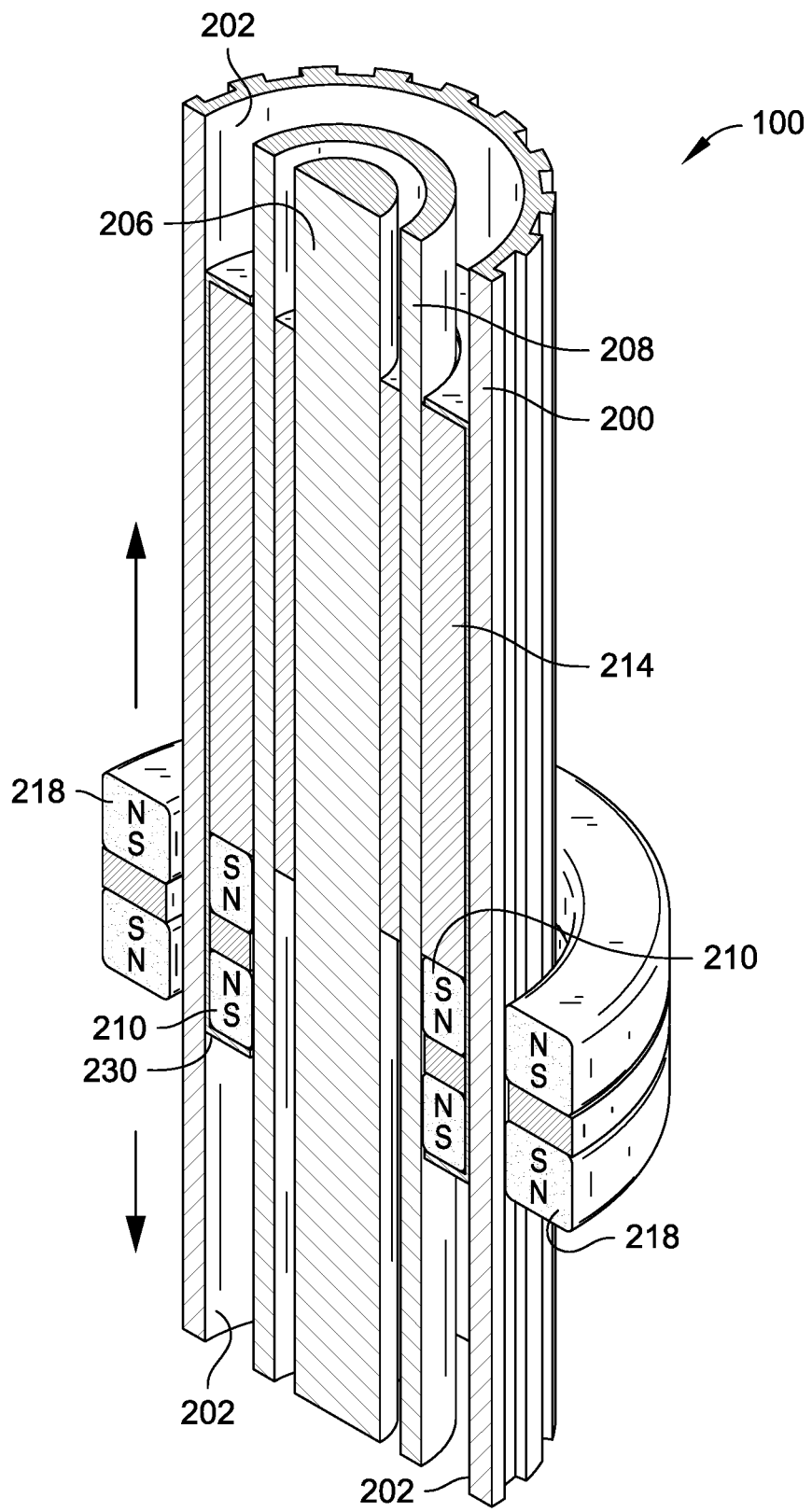
FIG. 4 is a partial cross-sectional isometric view of the autosampler probe rail system of FIG. 1A, showing magnets supported by the inner shuttle relative to magnets supported by an outer shuttle.
Figure 5:
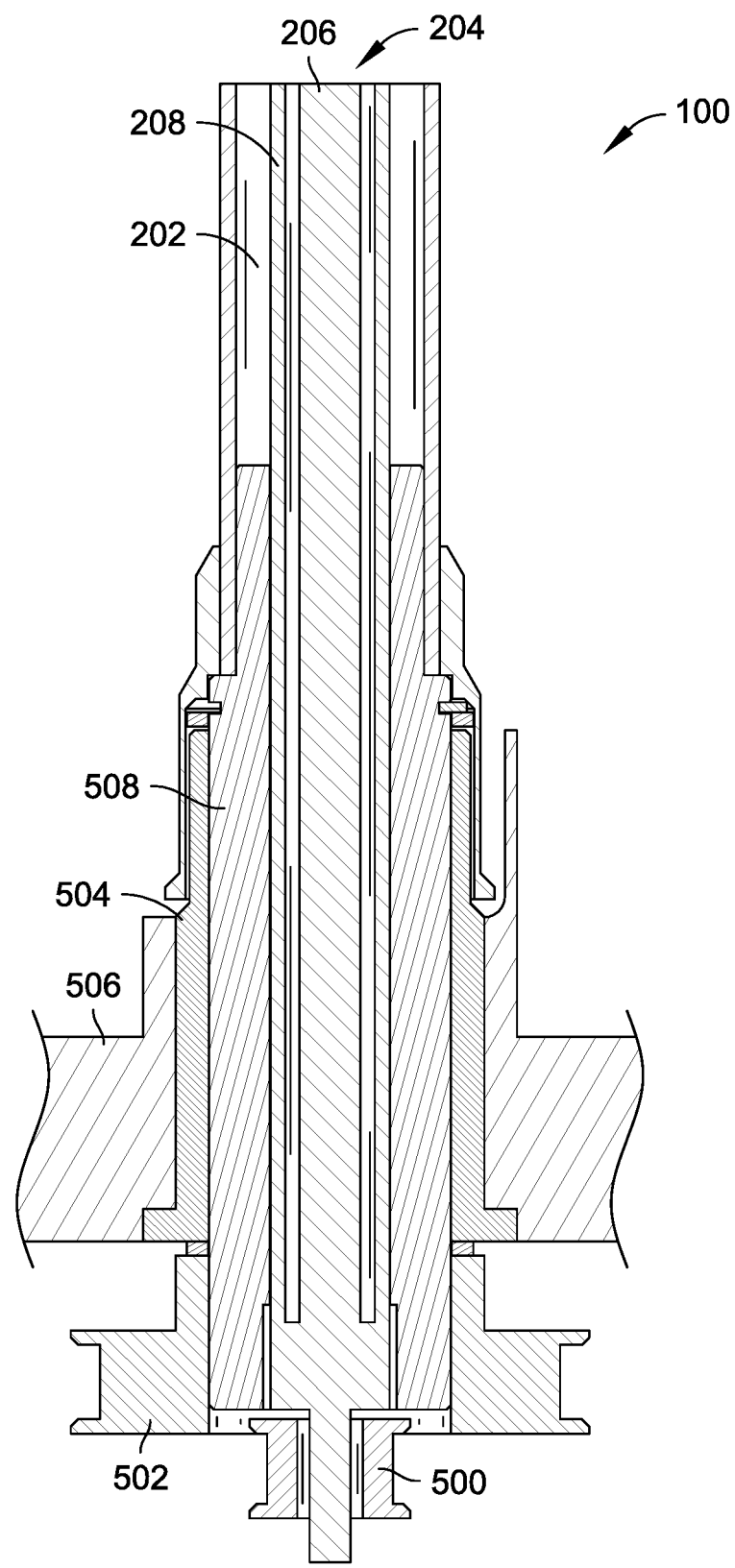
FIG. 5 is a partial cross-sectional side view of the autosampler probe rail system of FIG. 1A with an associated drive system.

Referring to FIG. 2, a cross-section of the system 100 is shown in accordance with example implementations of the present disclosure. The z-axis support 108 is shown having an external tube 200 defining an interior volume 202 through which the inner shuttle 106 is configured to pass to influence vertical movement of the outer shuttle 104. The system 100 can move the inner shuttle 106 within the tube 200 through various mechanisms including, but not limited to, a linear actuator (e.g., a pneumatic actuator) with a push rod, a spline screw rail, or combinations thereof. The system 100 is shown in example implementations having a spline screw rail 204 (e.g., as seen in FIGS. 2-5). The spline screw rail 204 includes a threaded screw 206 positioned along the z-axis 114 with a structural rail 208 positioned around a portion of the screw 206. The structural rail 208 is fixedly mounted to a base, while the screw 206 is rotatably coupled within the tube 200. For example, the system 100 can include a first drive (e.g., a pulley drive 500 shown in FIG. 5) to induce rotational motion of the screw 206 within the tube 200. The inner shuttle 106 includes corresponding threads on an interior surface of the inner shuttle 106 to mate with the threads of the screw 206. As the screw 206 is rotationally driven, the inner shuttle 106 is moved vertically along the z-axis 114 within the tube 200 (e.g., through the interior volume 202) via interaction between the respective threads. Alternatively or additionally, the system 100 includes a pneumatic actuator to push the inner shuttle 106 vertically within the interior volume 202. In implementations, the inner shuttle 106 defines one or more apertures to correspond to the shape of the structural rail 208 such that the structural rail 208 passes through the aperture(s) of the inner shuttle 106 as the inner shuttle 106 is moved within the tube 200. For example, the inner shuttle 106 is shown in an example embodiment in FIG. 3 with a 'C' shaped aperture to conform to the 'C' shaped structural rail 208.

The outer shuttle 104 and the inner shuttle 106 each include one or more magnets to magnetically couple the respective shuttles such that when the inner shuttle 106 is driven along the z-axis 114 (e.g., via operation of the spline screw rail 204 and the first drive, via operation of a pneumatic actuator, etc.), the outer shuttle 104 follows a corresponding vertical movement along the outer surface of the z-axis support 108. For example, the inner shuttle 106 is shown having two magnets 210 positioned within an external structure 212 of the inner shuttle 106. The external structure 212 can include, but is not limited to, a polyvinylidene difluoride (PVDF) material wrapped around a body structure 214 of the inner shuttle 106. In implementations, the body structure 214 defines the corresponding threading to mate with the threading of the screw 206. The magnets 210 are shown having a circular or ring shape having an aperture in the middle through which structure of the spline screw rail 204 can pass. For example, the magnets 210 surround the z-axis 114 with the spline screw rail 204 passing through the aperture of the magnets 210. The inner shuttle 106 is shown with a spacer structure 216 positioned between the magnets 210. The external structure 212 and the body structure 214 can push each magnet 210 against the spacer structure 216 to control the separation between the magnets 210, such as to maintain a substantially uniform distance between the magnets 210 during operation of the system 100. The magnets 210 are aligned such that the same poles face each other (e.g., the same pole interfaces with the spacer structure 216). For example, FIG. 2 shows that the north poles of each magnet 210 face each other with the spacer structure 216 positioned in between and with the south poles oriented away from each other. Alternatively, the south poles of the magnets 210 could face each other with the north poles oriented away from each other.

The outer shuttle 104 includes corresponding magnets to interact with the magnets 210 of the inner shuttle 106. For example, the outer shuttle 104 is shown having two corresponding magnets 218 held within a body structure 220. Similar to the inner shuttle 106, the outer shuttle 104 can include a spacer structure 222 positioned between the magnets 218 within the body structure 220. In implementations, the body structure 220 includes a top portion 224 coupled with a bottom portion 226 with a cavity defined between the top portion 224 and the bottom portion 226 to house the magnets 218 and the spacer structure 222. The top portion 224 and the bottom portion 226 can be secured together (e.g., snap fit) to position the magnets 218 against the spacer structure 222. The magnets 218 are aligned such that the same poles face each other, with the poles of the magnets 218 having the opposite poles facing the poles of the adjacent magnets 210 of the inner shuttle 106. For example, as shown in FIG. 2, the north poles of the magnets 218 face the south poles of the magnets 210 (e.g., with the tube 200 positioned therebetween), and the south poles of the magnets 218 face the north poles of the magnets 210 (e.g., with the tube 200 positioned therebetween). By facing the opposing poles of the magnets 210 and the magnets 218, the magnetic fields couple the inner shuttle 106 with the outer shuttle 104 such that linear motion of the inner shuttle 106 causes a corresponding linear motion of the outer shuttle 104. While the system 100 is shown having two magnets for each of the outer shuttle 104 and the inner shuttle 106, the system 100 is not limited to two magnets and can include fewer or more magnets for each shuttle (e.g., depending on a desired attractive force between the respective shuttles).

In implementations, the tube 200 defines surface features on an outer surface of the tube 200 to facilitate rotational motion of the outer shuttle 104 when the tube 200 is rotated. For example, the tube 200 is shown having a plurality of splines 300 longitudinally oriented along the outer surface of the tube 200. The outer shuttle 104 includes corresponding features on an inner surface to interface with the surface features of the tube 200. For example, the outer shuttle 104 is shown having corresponding splines 302 that mate with gaps between the splines 300 of the tube 200. The surface features of the tube 200 and the outer shuttle 104 interact to translate rotational motion of the tube 200 to the outer shuttle 104, which in turn is translated to the probe support structure 102 to rotate the probe support structure 102 about the z-axis 114. In implementations, the tube 200 is rotated through operation of a second drive (e.g., a pulley drive 502 shown in FIG. 5) to induce rotational motion of the tube 200. For example, the system 100 can include a bushing 504 coupled between a stationary drive base 506 and a rotational drive structure 508. The rotational drive structure 508 is coupled to the pulley drive 502 to rotate about the z-axis 114 upon operation of the pulley drive 502. The tube 200 is coupled to the rotational drive structure 508 to correspondingly rotate upon operation of the pulley drive 502, which in turn rotates the outer shuttle 104 through interaction of the corresponding surface features (e.g., splines 300 and 302) to rotate the probe support structure 102.

Figure 6:
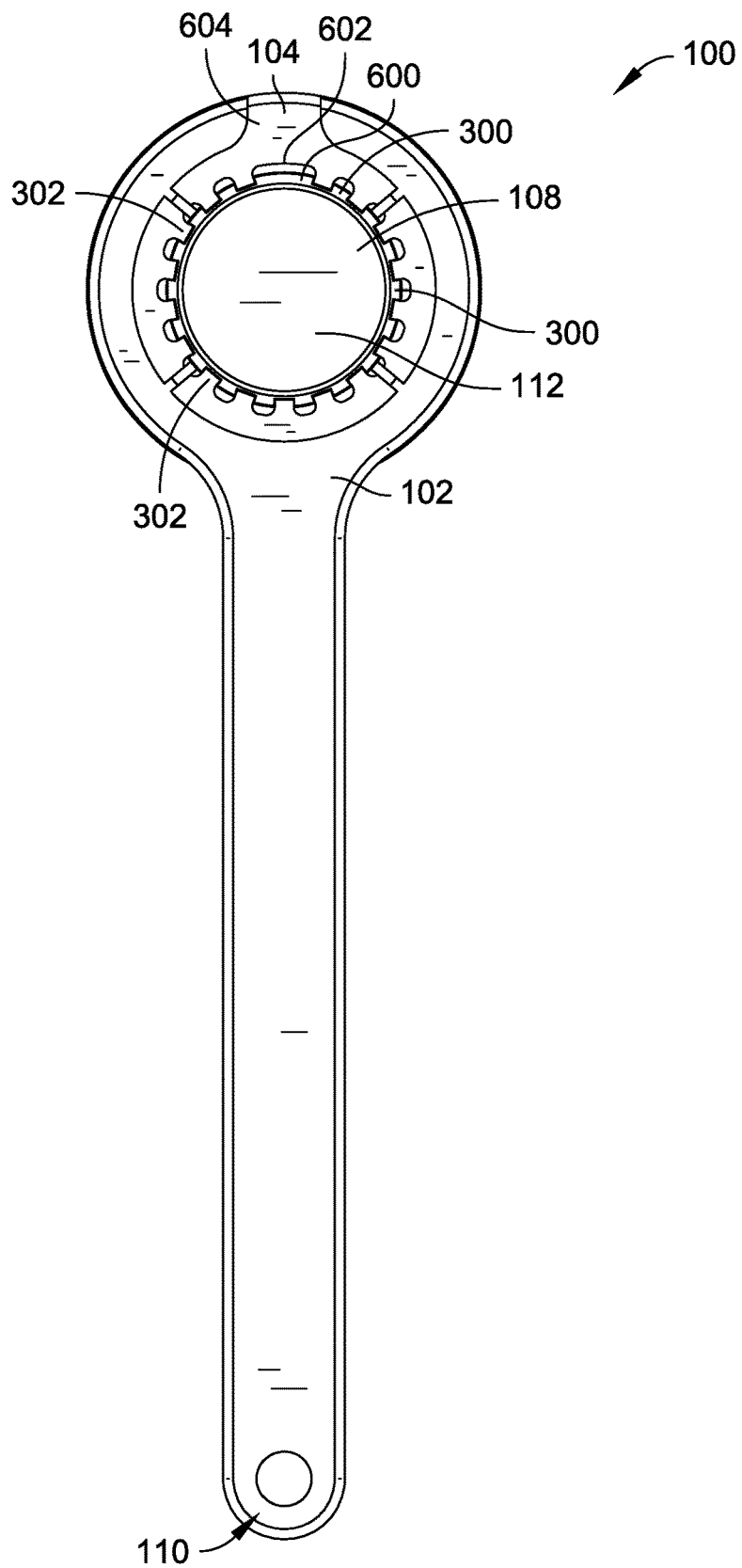
FIG. 6 is a top view of the autosampler probe rail system of FIG. 1A.
Figure 7:
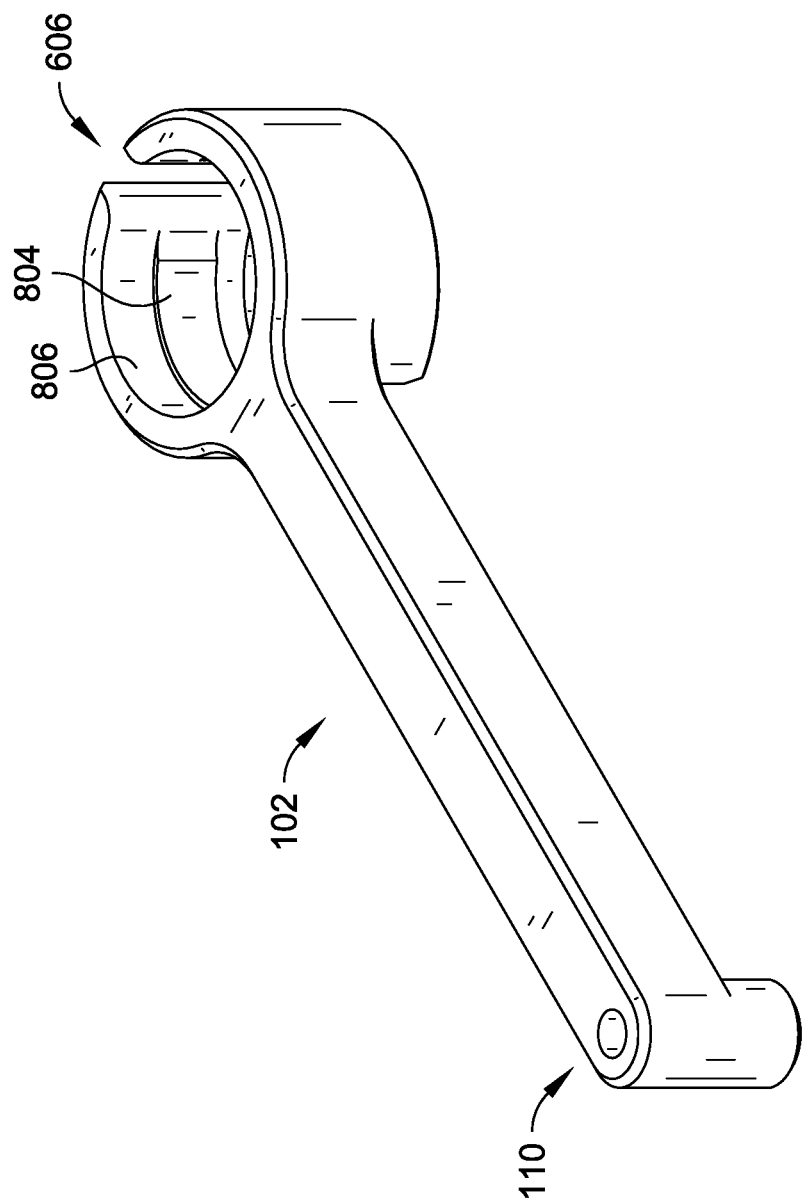
FIG. 7 is an isometric view of a support arm of the autosampler probe rail system of FIG. 1A.

The outer shuttle 104 can be installed onto the z-axis support 108 by positioning the body structure 220 adjacent the upper portion 112 of the z-axis support 108, with an end 228 of the body structure 220 housing the magnets 218 being positioned to correspond to an end 230 of the body structure 214 housing the magnets 210 to permit interaction between the respective magnetic fields of the inner shuttle 106 and the outer shuttle 104 to magnetically couple the respective shuttles. The surface features of the outer shuttle 104 and the tube 200 (e.g., splines 302 and 300, respectively) can slide next to each other as the outer shuttle 104 is positioned down the z-axis support 108 until the magnets 218 couple with the magnets 210. In implementations, the system 100 includes a key structure to orient the probe support structure 102 in a predetermined direction upon installation on the z-axis support 108, such as to provide a specific position of a probe held by the probe support structure 102 for indexing purposes through rotation of the tube 200. For example, FIG. 6 shows the tube 200 defining a key structure 600 (e.g., a spline having a larger cross section than other splines 300), with the outer shuttle 104 defining a corresponding key structure 602 (e.g., an aperture to receive the key structure 600). The probe support structure 102 and the outer shuttle 104 also include corresponding key structures to provide a desired orientation of the probe support structure 102 with respect to the tube 200. For example, the outer shuttle 104 is shown including a key structure 604 with the probe support structure 102 including a corresponding key structure 606 (e.g., an aperture to receive the key structure 604). In implementations, the probe support structure 102 is removably coupled to the outer shuttle 104, such that a different probe support structure 102 can couple with the outer shuttle 104. Alternatively or additionally, a different outer shuttle can be positioned on the z-axis support 108 to introduce a different style of probe support structure onto the z-axis support (e.g., to facilitate a septum piercing probe, or the like).

Figure 8:
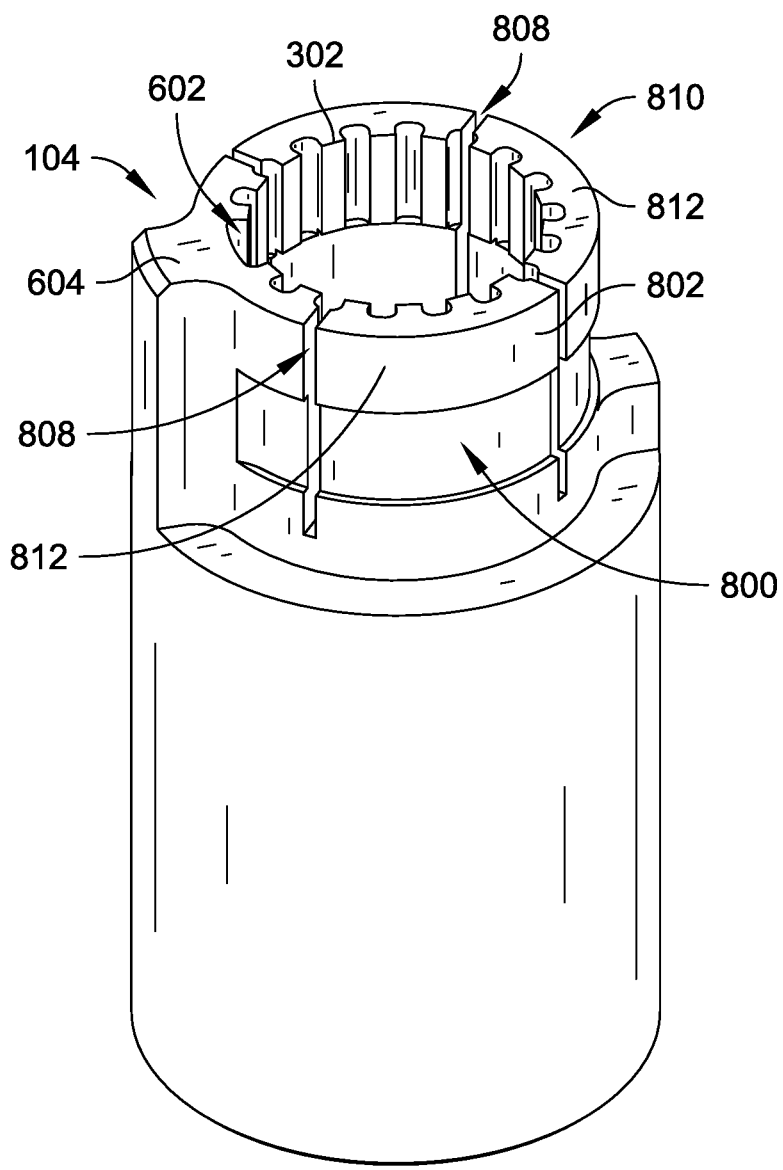
FIG. 8 is a partial isometric view of an outer shuttle of the autosampler probe rail system of FIG. 1A in accordance with an example embodiment of the present disclosure.

The probe support structure 102 and the outer shuttle 104 can include a locking structure to secure the probe support structure 102 relative to the outer shuttle 104. For example, the outer shuttle 104 is shown in FIG. 8 defining a groove 800 on an outer surface 802 of the body structure 220 that is sized and dimensioned to receive a protrusion 804 (e.g., shown in FIG. 7) positioned on an interior surface 806 of the probe support structure 102. Alternatively or additionally, the probe support structure 102 can define a groove and the outer shuttle 104 can define a corresponding protrusion. During installation of the probe support structure 102 onto the outer shuttle 104, the protrusion 804 can mate with the groove 800 to provide a lock-fit arrangement between the probe support structure 102 and the outer shuttle 104 to securely hold the probe support structure 102 relative to the outer shuttle 104 and z-axis support 108. For example, interaction between the groove 800 and the protrusion 804 can prevent removal of the probe support structure 102 from the outer shuttle 104 via vertical forces overcoming mere friction fit between the probe support structure 102 and the outer shuttle 104.

In implementations, the outer shuttle 104 can define segments at a top portion of the outer shuttle 104 receiving the probe support structure 102. The probe support structure 102 can push against the segments which in turn provide a compliant fit against the tube 200 of the z-axis support 108 to provide a secure fit of the outer shuttle 104 and the z-axis support 108. For example, the outer shuttle 104 is shown in FIG. 8 to include a plurality of vertically cuts 808 through a top portion 810 of the outer shuttle 104 to divide the top portion 810 into multiple segments 812. When the probe support structure 102 is introduced onto the outer shuttle 104, the probe support structure 102 can provide an inward force onto the segments 812, which in turn can push against the z-axis support (e.g., against the splines 300) to secure the outer shuttle 104 in place. While FIG. 8 shows the top portion 810 divided into four segments 812, the present disclosure is not limited to such arrangement. For instance, the top portion 810 could be divided into fewer than four segments 812, into more than four segments 812, into equally-sized segments 812, into unequally-sized segments, or the like.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A transfer system comprising:
   a sample probe support arm configured to hold a sample probe, the sample probe configured to transfer fluid samples through the sample probe while being held by the sample probe support arm;
   a z-axis support coupled with the sample probe support arm;
   an outer shuttle coupled with an outer surface of the z-axis support and coupled with the sample probe support arm; and
   an inner shuttle linearly moveable within an interior volume of the z-axis support, the inner shuttle magnetically coupled with the outer shuttle to translate linear motion of the inner shuttle to the outer shuttle to provide linear motion of the sample probe support arm.

2. The transfer system of claim 1, wherein the z-axis support includes a tube extending along the z-axis support defining the interior volume, the tube including a portion disposed between the outer shuttle and the inner shuttle.

3. The transfer system of claim 2, wherein the tube defines one or more surface splines on an outer surface of the tube, and wherein the outer shuttle defines one or more corresponding surface splines on an interior surface of the outer shuttle such that rotational motion of the tube is translated to the outer shuttle through interaction between the one or more surface splines and the one or more corresponding surface splines.

4. The transfer system of claim 3, further comprising a drive system coupled with the tube, wherein the drive system provides rotational motion of the tube upon operation of the drive system.

5. The transfer system of claim 4, further comprising a second drive system coupled with the inner shuttle to provide the linear motion of the inner shuttle within the interior volume of the tube.

6. The transfer system of claim 1, further comprising a drive system coupled with the inner shuttle to provide the linear motion of the inner shuttle within the interior volume of the tube.

7. The transfer system of claim 1, wherein the inner shuttle includes one or more magnets housed within an exterior structure of the inner shuttle, wherein the outer shuttle includes one or more magnets housed within a body structure of the outer shuttle, and wherein the one or more magnets of the inner shuttle are magnetically coupled with the one or more magnets of the outer shuttle.

8. The transfer system of claim 7, wherein the one or more magnets of the inner shuttle include a first magnet vertically spaced from a second magnet via a spacer structure.

9. The transfer system of claim 8, wherein a first pole of the first magnet and a first pole of the second magnet are each positioned against the spacer structure, and wherein the first pole of the first magnet and the first pole of the second magnet are the same magnetic pole.

10. The transfer system of claim 8, wherein the one or more magnets of the outer shuttle include a first magnet vertically spaced from a second magnet via a second spacer structure.

11. The transfer system of claim 10, wherein a first pole of the first magnet of the outer shuttle and a first pole of the second magnet of the outer shuttle are each positioned against the second spacer structure, and wherein the first pole of the first magnet of the outer shuttle and the first pole of the second magnet of the outer shuttle are the same magnetic pole.

12. The transfer system of claim 1, wherein at least a portion of each of the z-axis support, the outer shuttle, and the sample probe support arm include a chemically-inert material.

13. The transfer system of claim 1, wherein an outer surface of the z-axis support defines a protrusion configured to mate with a corresponding aperture positioned on an inner surface of the outer shuttle.

14. The transfer system of claim 13, wherein the outer shuttle defines a second protrusion positioned on an outer surface of the outer shuttle configured to mate with a corresponding second aperture positioned on the sample probe support arm to orient the sample probe support arm relative to the outer shuttle.

15. The transfer system of claim 1, wherein the outer shuttle defines at least two segments positioned at a top portion of the outer shuttle, and wherein the sample probe support arm provides an inward force against the at least two segments to push the at least two segments against the z-axis support.

16. The transfer system of claim 1, wherein the outer shuttle defines a groove on an outer surface of the outer shuttle, and wherein the sample probe support arm defines a protrusion on an interior surface of the sample probe support arm configured to be introduced into the groove.

17. A transfer system comprising:
   a sample probe support arm configured to hold a sample probe, the sample probe configured to transfer fluid samples through the sample probe while being held by the sample probe support arm;
   a z-axis support coupled with the sample probe support arm;

an outer shuttle coupled with the z-axis support and coupled with the sample probe support arm, the outer shuttle including at least a first magnet;

an inner shuttle linearly moveable within an interior volume of the z-axis support, the inner shuttle including at least a second magnet, the inner shuttle magnetically coupled with the outer shuttle via magnetic interaction between the first magnet and the second magnet to translate linear motion of the inner shuttle to the outer shuttle to provide linear motion of the sample probe support arm, wherein the z-axis support includes a tube having a portion disposed between the outer shuttle and the inner shuttle, the tube defining the interior volume through which the inner shuttle passes during linear motion.

18. The transfer system of claim 17, wherein the tube defines one or more surface splines on an outer surface of the tube, and wherein the outer shuttle defines one or more corresponding surface splines on an interior surface of the outer shuttle such that rotational motion of the tube is translated to the outer shuttle through interaction between the one or more surface splines and the one or more corresponding surface splines.

19. The transfer system of claim 18, further comprising a first drive system coupled with the inner shuttle to provide the linear motion of the inner shuttle within the interior volume of the tube.

\* \* \* \* \*